US012657229B2

(12) United States Patent
Bondugula et al.

(10) Patent No.: US 12,657,229 B2
(45) Date of Patent: Jun. 16, 2026

(54) SYSTEMS AND METHODS FOR AN AI FRAMEWORK FOR CLASSIFYING LABELLED DATA

(71) Applicant: VERIZON PATENT AND LICENSING INC., Basking Ridge, NJ (US)

(72) Inventors: Rajkumar Bondugula, Coppell, TX (US); Deepa Thazhathu Veetil, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/904,412

(22) Filed: Oct. 2, 2024

(65) Prior Publication Data

US 2026/0093748 A1 Apr. 2, 2026

(51) Int. Cl.
| | |
|---|---|
| *G06F 16/35* | (2025.01) |
| *G06F 16/31* | (2019.01) |
| *G06F 16/334* | (2025.01) |
| *G06F 16/383* | (2019.01) |

(52) U.S. Cl.
CPC ............ *G06F 16/35* (2019.01); *G06F 16/322* (2019.01); *G06F 16/3344* (2019.01); *G06F 16/383* (2019.01)

(58) Field of Classification Search
CPC .... G06F 16/35; G06F 16/322; G06F 16/3344; G06F 16/383

USPC .......................................................... 707/737
See application file for complete search history.

(56) References Cited

U.S. PATENT DOCUMENTS

| | | | | |
|---|---|---|---|---|
| 11,048,979 | B1 * | 6/2021 | Zhdanov ............... | G06F 16/335 |
| 11,748,382 | B2 * | 9/2023 | Saillet ................... | G06F 16/221 |
| | | | | 707/737 |
| 12,141,186 | B1 * | 11/2024 | Tomar ................... | G06F 16/355 |
| 2018/0196871 | A1 * | 7/2018 | Butler ................... | G06F 16/338 |
| 2023/0385284 | A1 * | 11/2023 | Glickman ......... | G06F 16/24564 |
| 2023/0409614 | A1 * | 12/2023 | Hamilton ............ | G06F 16/9024 |
| 2024/0005025 | A1 * | 1/2024 | White ................ | G06F 16/2458 |
| 2024/0202356 | A1 * | 6/2024 | White .............. | G06F 16/24547 |

* cited by examiner

*Primary Examiner* — Shahid A Alam

(57) ABSTRACT

Disclosed are systems and methods that provide a computerized framework for classifying data at scale, particularly when dealing with complex datasets that include ambiguous, incomplete and/or non-standard data. The disclosed framework provides a computerized solution that is scalable, accurate and capable of handling the complexities of the dataset while ensuring data treatment was done in line with legal and security requirements. The framework can operate to classify text-based data even when the data itself is incomplete, ambiguous, overlapping, and/or inconsistent, which can be particularly important for a wireless provider, where data is often scattered across different systems, and the information available for classification might be fragmented or contradictory. The framework provides functionality for classifying data automatically and efficiently, even as the volume of data grows exponentially.

20 Claims, 5 Drawing Sheets

100

300

302 — Identify a dataset

304 — Analyze dataset

306 — Determine data profile and metadata for the dataset

308 — Perform Stage 1 classification

310 — Execute transformation applications

312 — Perform Stage 2 classification

314 — Perform data classification

316 — Catalog dataset with annotations

318 — Output data to a marketplace

SYSTEMS AND METHODS FOR AN AI FRAMEWORK FOR CLASSIFYING LABELLED DATA

BACKGROUND INFORMATION

Service providers, content providers and third party entities can act to classify data to ensure appropriate levels of security, privacy, compliance and understanding are achieved, which can be tied to business purposes and/or operations of certain technologies on and/or over the Internet. Such classifications can aid in protecting sensitive information, meeting legal requirements, and optimizing resource management based on the value and sensitivity of the data.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
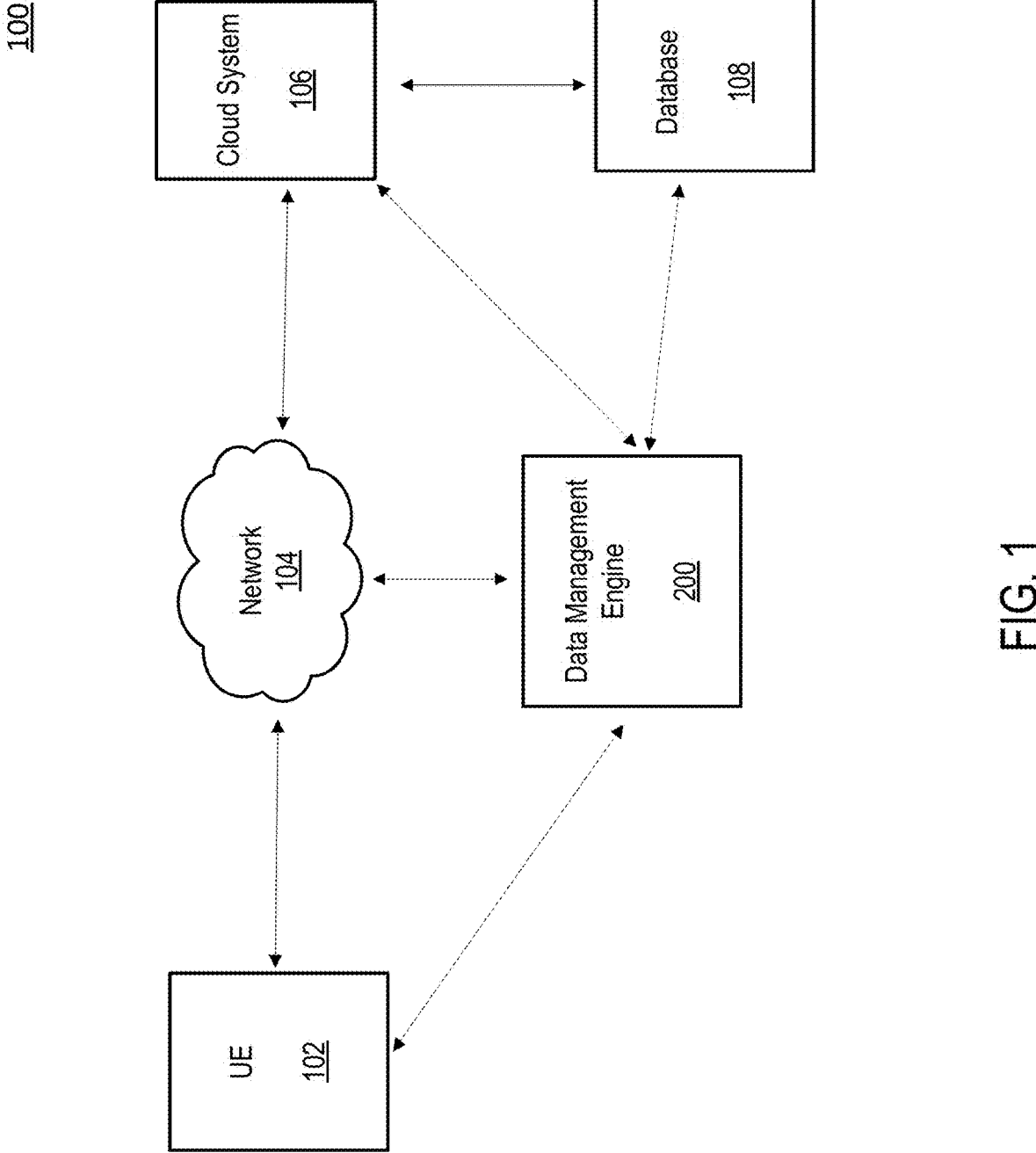
FIG. 1 is a block diagram of an example network architecture according to some embodiments of the present disclosure.

According to some embodiments, the disclosed systems and methods provide a computerized framework for which data, inclusive of service provider/content provider generated, application generated, user generated and/or third party generated, can be classified when a limited portion of such data is available. For example, data, related to text, can be limited when only short (e.g., less than a threshold amount of characters, for example), incomplete, ambiguous, overlapping, inconsistent, inaccurate, imbalanced, non-standard labelled data, and the like, or some combination thereof, is available. Such availability may be upon request, and/or as a starting point for a search (e.g., at the query level, for example).

According to some embodiments, disclosed is a classification framework designed to operate effectively under challenging data conditions, for example when the data is short, incomplete, ambiguous, overlapping, inconsistent, inaccurate, imbalanced, and non-standard. It should be understood that while the discussion herein may focus on text data, it should not be construed as limiting as other forms, formats and/or types of data can be utilized as a basis for the disclosed classification without departing from the scope of the instant disclosure.

According to some embodiments, the disclosed framework addresses common issues that arise in real-world datasets, particularly in industries like telecommunications where data flows across borders and requires rigorous classification for security, compliance, and analytics purposes. In this context, for example, the disclosed framework can be implemented at a wireless service provider, where it can operate to ensure that sensitive data is properly treated and managed, based on its classification.

In some embodiments, the disclosed framework can operate to provide safe, secure, efficient and accurate data management. In some embodiments, for example, for a wireless service provider, data is constantly being moved and shared across different systems, regions and departments. Each time data is transferred, the provider must ensure that it complies with various legal, security and/or privacy regulations. For example, data shared across borders must comply with international regulations such as the General Data Protection Regulation (GDPR), while data accessed within a specific country may need to adhere to national security policies.

To handle these varied requirements, the data must be "treated" based on its classification. The treatments can involve techniques, such as, for example, one-way hashing, two-way hashing, masking, encryption, and the like. Such processes can ensure that sensitive information is either anonymized or protected when shared across systems, making it difficult for unauthorized parties to reverse-engineer or misuse the data. Additionally, such treatment helps enable data analytics by ensuring that the right data is made available for analysis without compromising privacy or security. In some embodiments, the nature of the treatment a particular piece of data receives can be determined by its classification, which can depend on factors like the destination of the data (cross-country data management), contractual obligations, security policies, compliance requirements, and the like.

Prior to the advent of the disclosed framework, wireless providers faced significant challenges in managing the classification of its data. Conventionally, data classification was either done manually or outsourced to vendor-provided software. Manual classification is extremely time-consuming and not scalable, especially given the massive volume of data handled by a large service provider. Moreover, manually categorizing data to determine which treatments to apply is prone to errors, inconsistencies and delays, particularly when data is needed to be processed rapidly or in real-time. Indeed, conventional vendor approaches struggled to properly handle the nuances of such datasets. For example, a customer's data could be scattered across multiple systems or be only partially available, making it difficult for the software to classify the data accurately and apply the appropriate treatments. Further, enterprise data in some organizations may be legacy data without access controls. In order to conform to security requirements, this data should be classified and given access controls. However, determining access restrictions is difficult because this data is stored in relational databases and the metadata pertaining to this data is primarily obtained from table column names. However, column naming in legacy databases may be highly inconsistent across tables, databases, users, systems and the like. Accordingly, these columns need to be classified into groups or clusters, despite differences in naming conventions.

To that end, the disclosed systems and methods provide the disclosed framework which, among other benefits, can operate to efficiently and accurately classify data at scale, particularly when dealing with complex datasets that include ambiguous, incomplete and/or non-standard data. The disclosed framework, as discussed herein, involves capabilities to keep up with such demand, especially when considering the need to comply with cross-border data regulations, maintain security policies, and ensure data protection. Thus, the disclosed framework provides a computerized solution that is scalable, accurate and capable of handling the complexities of the dataset while ensuring data treatment was done in line with legal and security requirements.

Accordingly, as discussed herein, the disclosed framework can operate to classify text-based data even when the data itself is incomplete, ambiguous, overlapping, and/or inconsistent. For example, this can be particularly important for a wireless provider, where data is often scattered across different systems, and the information available for classification might be fragmented or contradictory.

As evidenced from the discussion herein, such operation can have several benefits. As an initial matter, the framework's operation can improve the scalability of data classification. Instead of relying on manual processes or under-performing vendor software as with conventional approaches, the disclosed framework provides wireless providers with functionality for classifying data automatically and efficiently, even as the volume of data grows exponentially. This scalability is critical in the telecommunications industry, where millions of data points are generated daily.

Additionally, the framework can enhance the accuracy of classification. By using advanced artificial intelligence (AI), machine learning (ML) and/or large language model (LLM) techniques, as discussed in more detail below, the framework can operate to classify short, incomplete, or ambiguous text with a high degree of accuracy. This ensures that the right treatments are applied to the right data, reducing the risk of non-compliance with security policies or international regulations.

Moreover, the framework includes capabilities for enhanced flexibility of data management systems. That is, due to the functionality of the framework to handle a wide range of data types and classification scenarios, the framework can be adapted to different contexts, ensuring that providers (or other entities handling such data) remain compliant with changing regulations and industry standards. Thus, the disclosed systems and methods provide a framework that is configured to provide improvements and advancements in the classification and management of text-based data, particularly in complex and high-volume environments, such as wireless (or cellular) technologies.

With reference to FIG. 1, system 100 is depicted which includes user equipment (UE) 102, network 104, cloud system 106, database 108, and data management engine 200. It should be understood that while system 100 is depicted as including such components, it should not be construed as limiting, as one of ordinary skill in the art would readily understand that varying numbers of UEs, engines, cloud systems, databases and networks can be utilized; however, for purposes of explanation, system 100 is discussed in relation to the example depiction in FIG. 1.

According to some embodiments, UE 102 can be any type of end-device operated in a mobile wireless network. For example, UE 102 can include, but not be limited to, a mobile phone, tablet, laptop, Internet of Things (IOT) device, wearable device, an autonomous guided vehicle (AGV), autonomous mobile robot (AMR), unmanned aerial vehicle (UAV), and/or any other device equipped with a cellular or wireless transceiver.

In some embodiments, network 104 can be any type of network, such as, but not limited to, a wireless network, cellular network (e.g., an LTE/5G NSA and/or a 5G SA network), and the like. Network 104 facilitates connectivity of the components of system 100, as illustrated in FIG. 1. Further discussion of embodiments of network 104 are provided below with reference to FIG. 4.

According to some embodiments, cloud system 106 may be any type of cloud operating platform and/or network-based system upon which applications, operations, and/or other forms of network resources may be located. For example, cloud system 106 may be a service provider and/or network provider from where services and/or applications may be accessed, sourced or executed from. For example, system 106 can represent the cloud-based infrastructure associated with an MNO or the tenant of a dedicated network (e.g., network 104), and communicates with associated network resources hosted in a private or neutral host network (e.g., network 104).

In some embodiments, cloud system 106 may include a server(s) and/or a database of information. In some embodiments, a database 108 of cloud system 106 may store a set of data and/or metadata associated with network information related to the components and/or the users (e.g., UEs 102) of system 100. In addition, database 108 may store information (e.g., metadata/templates based on BBU and private core specifications) used by a data management engine 200, which corresponds to the novel functionality described herein.

In some embodiments, cloud system 106 can provide a private/proprietary management platform for network 104 and other devices/platforms operating thereon, and further host and/or communicate with data management engine 200.

According to some embodiments, database 108 may correspond to a data storage for a platform (e.g., a network hosted platform, such as cloud system 106) or a plurality of platforms. Database 108 may receive storage instructions/requests from, for example, data management engine 200 (and associated microservices), which may be in any type of known or to be known format, such as, for example, standard query language (SQL). Database 108 may correspond to any type of known or to be known storage, for example, a memory or memory stack of a device, a distributed ledger of a distributed network (e.g., blockchain, for example), a look-up table (LUT), and/or any other type of secure data repository.

Data management engine 200, as discussed above and further below in more detail, can include components for the disclosed functionality. According to some embodiments, data management engine 200 may be a special-purpose machine or processor within cloud system 106, or hosted by a device (or component) on network 104. In some embodiments, data management engine 200 may be hosted by a server and/or set of servers associated with cloud system 106.

According to some embodiments, data management engine 200 may be configured to implement and/or control a plurality of services and/or microservices, where each of the plurality of services/microservices are configured to execute a plurality of workflows associated with performing the disclosed estimation of backhaul bandwidth and private core capacity. Non-limiting embodiments of such workflows are provided below.

According to some embodiments, data management engine 200 may function as an application provided by and/or hosted by cloud system 106. In some embodiments, data management engine 200 may function as an application installed on a server(s), network location and/or other type of network resource associated with cloud system 106 and/or network 104. In some embodiments, data management engine 200 may be configured and/or installed as an augmenting script, program or application (e.g., a plug-in or extension) to another application or program provided by cloud system 106 and/or network 104.

Figure 2:
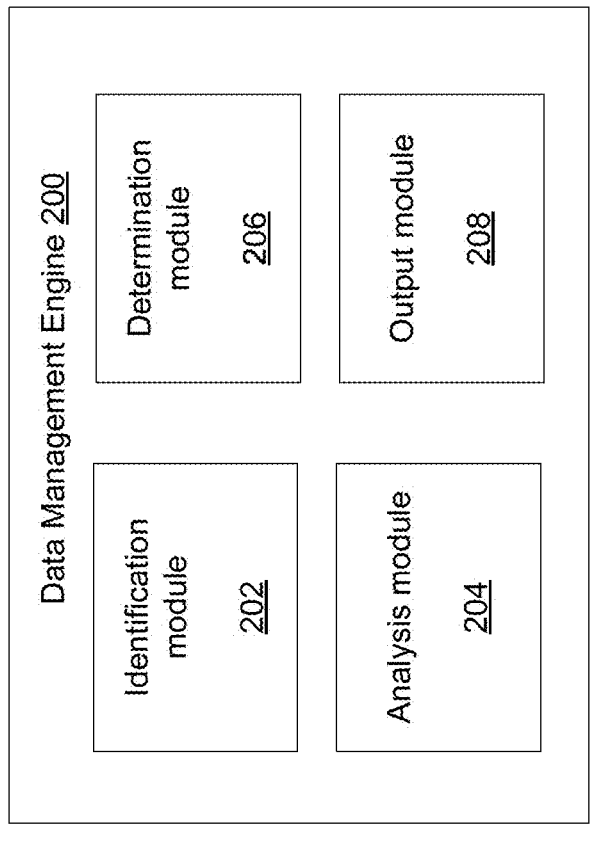
FIG. 2 is a block diagram illustrating components of an exemplary system according to some embodiments of the present disclosure.

As illustrated in FIG. 2, according to some embodiments, data management engine 200 includes identification module 202, analysis module 204, determination module 206 and output module 208. It should be understood that the modules discussed herein are non-exhaustive, as additional or fewer modules (or sub-modules) may be applicable to the embodiments of the systems and methods discussed. More detail of the operations, configurations and functionalities of data management engine 200 and each of its modules, and their role within embodiments of the present disclosure will be discussed below.

Figure 3:
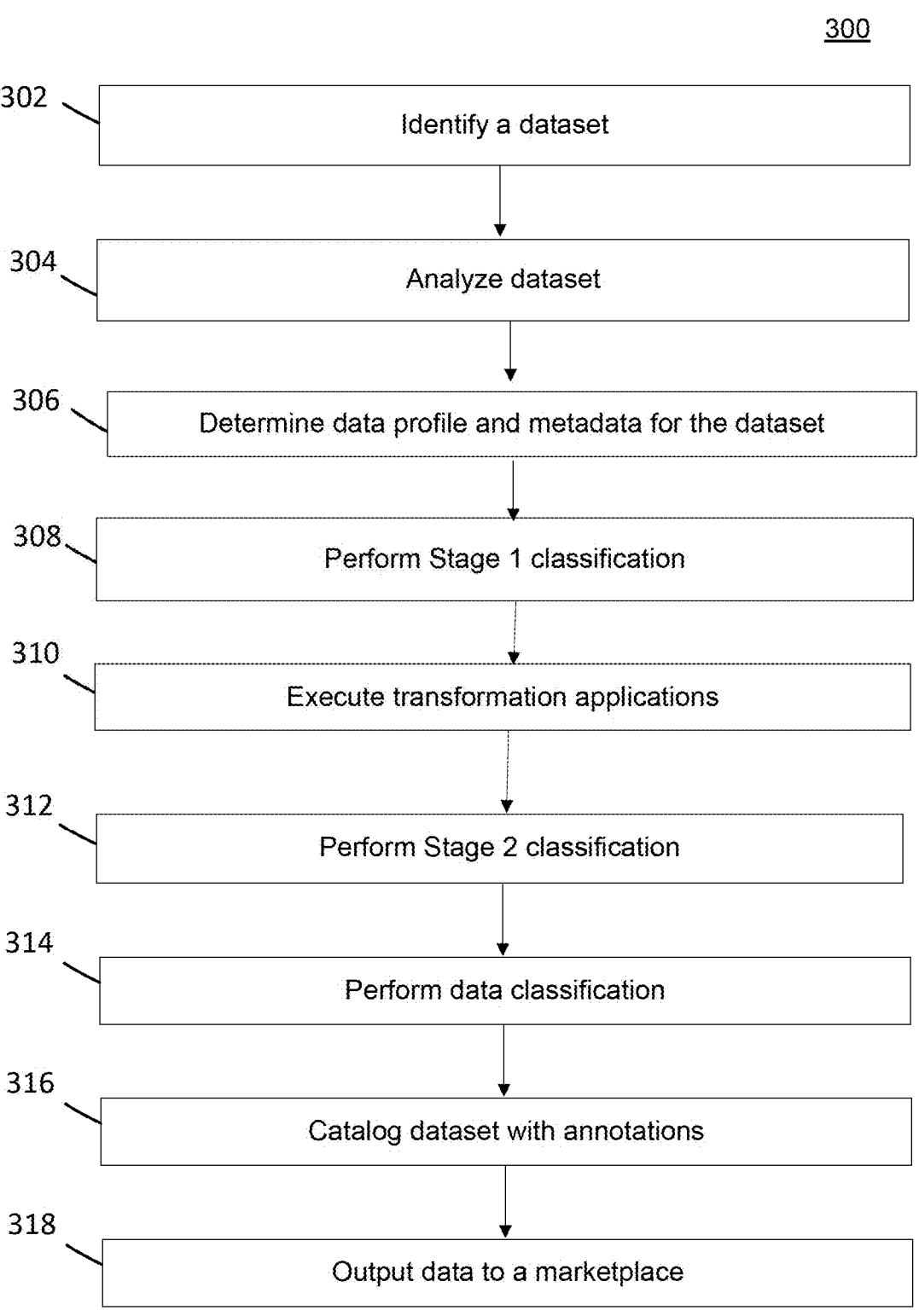
FIG. 3 illustrates an exemplary workflow according to some embodiments of the present disclosure.

In FIG. 3, Process 300 provides non-limiting example embodiments for advanced data processing and management pursuant to classification and dissemination over a network to entities, which can include, but is not limited to, third parties, internal systems, and the like. As discussed herein, the disclosed framework operates to perform pre-processing, real-time processing and/or post-processing of data to curate inaccurate and/or inconsistent data, which can involve imputation, generation, normalizing, standardizing and/or ensuring uniformity, among other techniques, as discussed herein.

According to some embodiments, Step 302 of Process 300 can be performed by identification module 202 of data management engine 200; Steps 304, and 308-312 can be performed by analysis module 204; Steps 306 and 314 can be performed by determination module 206; and Steps 316 and 318 can be performed by output module 208.

According to some embodiments, Process 300 begins with Step 302 where engine 200 can identify a dataset. According to some embodiments, a dataset can correspond to specific data sources, which can include internal data sources (e.g., customer data) and/or external data (from third party network resources, for example).

According to some embodiments, the identification of the dataset(s) can be based on a request and/or other form of criteria (e.g., time, date, location, application initiation, network activity, and the like, or some combination thereof).

By way of example, a wireless provider can identify datasets from various sources for analysis by employing a multifaceted approach. In some embodiments, for example, a provider can identify internal data sources, such as customer information databases, network performance logs, call detail records, and the like. Such datasets can offer insights into user behavior, network usage patterns, service quality, and the like, or some combination thereof. In some embodiments, external sources can be used (and/or can complement such internal data), and can include, for example, public datasets from government agencies, demographic information from market research firms, geographic data from mapping services, and the like. Social media platforms and application usage statistics can provide additional context on customer preferences and trends.

In Step 304, engine 200 can analyze the identified dataset. It should be understood that while the discussion herein will focus on a single dataset, it should not be construed as limiting, as the disclosed systems and methods and operational steps discussed herein with reference to Process 300 can be performed for a plurality of datasets (e.g., iteratively, simultaneously, and/or in an overlapping manner, for example) without departing from the scope of the instant disclosure.

According to some embodiments, the processing in Step 304 can involve parsing the dataset, which can be based on a criteria (e.g., a type of data, category of data, identifier (ID), time, date, location, service type, content type, and the like, or some combination thereof), and extracting information based therefrom.

In some embodiments, such analysis in Step 304 can involve engine 200 implementing any type of known or to be known computational analysis technique, algorithm, mechanism or technology to analyze the dataset. For example, in some embodiments, engine 200 may execute and/or include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may leverage a large language model (LLM), whether known or to be known. An LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the dataset, as discussed herein.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
    b. transfer the input data to the neural network model,
    c. train the model incrementally,
    d. determine the accuracy for a specific number of timesteps,
    e. apply the trained model to process the newly received input data,
    f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 306, based on the analysis from Step 304, engine 200 can determine information related to a data profile and metadata for the dataset. According to some embodiments, data profiles and metadata are essential components in the analysis of datasets, providing crucial insights into the structure, content and context of the data being examined.

As discussed herein, a data profile, configured as a data structure (or file, object or item) serves as a comprehensive summary of a dataset's characteristics, providing an overview of the context and/or indications of the information within the dataset. In some embodiments, for example, a profile can include information encompassing, but not limited to, a number of rows, a number of columns, data types present within such columns/rows, counts of unique values, occurrences of null entries, minimum and maximum values, frequency distributions for each column, types and/or values of such distributions, and the like, or some combination thereof. Such information (which can be in the form of metrics, values or statistics) can provide a quantitative snapshot of the dataset's composition and identify potential areas of interest or concern (e.g., incomplete data for example, as discussed supra).

In some embodiments, such data profile can incorporate data quality metrics, which assess the completeness, consistency and/or accuracy of the information from within the dataset. Such metrics can provide an indication as to a reliability and/or usability of the dataset for various analytical purposes (e.g., which type of request and/or entity is utilizing/requesting the dataset).

In some embodiments, such data profile can include information related to patterns and/or anomalies within the data of the dataset, which can draw attention to common trends and/or unusual data points that might require further investigation and/or mitigation. Relationships between different columns or variables can be provided via the information within the dataset, which can provide indications of correlations and/or dependencies that could inform subsequent analyses. In some embodiments, a data profile can include a summary visualization(s), such as, for example, a compiled chart and/or graph that can visually represent the data's distribution and key characteristics.

In some embodiments, the metadata can provide a context and/or supplementary information about the data within the dataset and/or the dataset itself (and/or the entity requesting the dataset, providing the dataset, a source of the dataset, destination of the dataset, and the like). The metadata can include information related to, but not limited to, entity ID, time, date, location, data type, data category, and the like, and/or any other metric or value (e.g., frequency and/or currency of information, for example) that can be used to describe the data within the dataset and/or data profile. For example, the metadata can indicate a source of data in the dataset and/or dataset, which can be an entity's domain or a network domain, for example.

In some embodiments, the metadata can include a data dictionary compiled based on the analysis and determination in Steps 304-306. Such dictionary, which can be compiled as a data structure (or file, object or item) can include information related to, but not limited to, definitions for each field, column or row, data types, coding schemes, access and usage rights, transformations, formats, and the like.

Continuing with Process 300, processing continues from Step 306 to Steps 308-312. According to some embodiments, the processing in such steps involves the performance of a "Stage 1" classification, as in Step 308, data transformations, as in Step 310, and then performance of a "Stage 2" classification, as in Step 312, which can be based on the outputs from Steps 308 and 310, discussed infra. Thus, as provided below, the below processing can involve the performance of a series of classifiers, including a RegEx, for example, on a portion of data, then remaining data can be analyzed via other and/or more complex classification techniques, as discussed below.

In Step 308, according to some embodiments, engine 200 can utilize a set of regular expressions to classify the dataset (e.g. based on analysis of the data profile and metadata (from Step 306)). As provided below, such analysis can be performed via Step 308 via any of the provided AI/ML applications for which an AI/ML classifier can be utilized. In some embodiments, a portion of the dataset can be subject to such analysis—for example, a percentage (e.g., 5% for example) of the dataset can be classified via the AI/ML classifiers in Step 308.

Accordingly, in some embodiments, in Step 308, engine 200 can execute an AI/ML application(s), with the information determined in Step 306 related to the data profile and metadata as input. According to some embodiments, such AI/ML application(s) can include, but not be limited to, a Naïve Bayes, Nearest Neighbor (KNN) and/or Decision Tree, and the like. In some embodiments, engine 200 can call and execute any of the above-mentioned AI/ML techniques. In some embodiments, such AI/ML-based analysis can be performed to classify the columns (of the dataset) for data protection. In some embodiments, as provided above, an output of the processing in Step 308 is the determination of a set of regular expressions related to the dataset.

In Step 310, as discussed above, engine 200 can transform information related to the dataset (e.g., information from Step 306, for example) into n representations (e.g., 2 representations). In some embodiments, such representations can include a Term Frequency Inverse Document Frequency (TF-IDF) representation and embeddings.

According to some embodiments, a dataset can be transformed into a TF-IDF representation through a process that quantifies the importance of words in a collection of documents. In some embodiments, engine 200 can tokenize the text from the dataset (and/or data in the dataset, and/or data profile and/or metadata) into individual words, whereby, for each word, a term frequency (TF) is determined by counting how often it appears. Engine 200 can then perform computations related to the inverse document frequency (IDF), which measures how common and/or rare a word is within the dataset (e.g., within a column, for example). A TF-IDF score for each word can be determined by multiplying its TF and IDF values, which results in a numerical representation where words that are frequent in the dataset (e.g., column), but rare across the dataset (e.g., corpus or other set of columns, for example), receive higher scores. This, therefore, highlights the most distinctive terms in the dataset (e.g., or within and/or across columns, for example).

In some embodiments, in Step 310, engine 200 can further execute an LLM application(s) to determine embeddings from the dataset, where the input to the LLM(s) can be the information determined in Step 306 related to the data profile and metadata as input. Such LLMs can be any type of LLM, whether known or to be known, as discussed above.

According to some embodiments, engine 200's execution of the LLM application(s) can involve the LLM(s) analyzing the information related to the dataset (e.g., data profile and metadata, discussed supra) to determine embeddings, which can be based on semantic analysis of the representations from within the data profile and/or metadata. For example, an LLM can analyze context, word usage patterns, and learned associations among columns from the dataset, inter alia, to perform similarity comparisons, clustering, and the like, As provided below, such embeddings can be utilized (in connection with the outputs from Step 308) to determine classifications of the text in the dataset.

In Step 312, engine 200 can perform the Stage 2 classification, which as discussed above, is based on the outputs from Steps 308 and 310. In some embodiments, engine 200 can execute any of the provided AI/ML applications for which an AI/ML classifier can be utilized to analyze and classify the set of regular expressions, transformations and/or embeddings, as discussed above.

Accordingly, in some embodiments, the outputs from Step 308, 310 and 312 can be stored in database 108, as discussed above.

In Step 314, engine 200 can operate to perform a data classification, via an ensemble-approach, of the dataset based on the analysis performed in Steps 308-312.

In some embodiments, the analysis in Step 314 can involve human-in-the-loop (HITL) classifiers, which can be utilized for any remaining data from the dataset not classified via the preceding steps.

According to some embodiments, Step 314 can involve performing the ensemble classification by combining the AI/ML and LLM analyses (from Steps 308-314, respectively) by integrating their respective outputs. In some embodiments, for example, the AI/ML model classifies columns based on statistical patterns and learned features, while the LLM generates embeddings capturing semantic relationships. Such complementary approaches can be combined by engine 200 executing techniques like stacking or blending. For example, engine 200 can implement a trained meta-classifier on the AI/ML classification probabilities and LLM embedding vectors as input features. In some embodiments, engine 200 can implement a weighted voting scheme, which can utilize the AI/ML classifications and the similarity between LLM embeddings as inputs to such scheme. Accordingly, in some embodiments, such ensemble can leverage the strengths of both approaches: the AI/ML's ability to detect structured patterns and the LLM's understanding of contextual semantics, which can provide robust and accurate classifications for the text of the dataset.

In Step 316, engine 200 can operate to catalog (or store) the dataset (from Step 302) with annotations that are compiled and/or determined based on the classification(s) from Step 314. According to some embodiments, engine 200 can determine annotations by inputting the output from Step 314 (and/or the outputs from Steps 308, 310 and/or 312) to a decision algorithm (e.g., fuzzy matching and/or clustering, for example) to group/cluster data and determine labels.

Accordingly, annotating a dataset based on ensemble output from AI/ML and LLM analyses can be achieved through a multi-faceted approach. The process can involve a confidence-based annotation, where high-confidence predictions are automatically applied while low-confidence items are flagged for further review (e.g., recursive AI/ML and/or LLM analysis, and/or human-in-loop review, for example). In some embodiments, such predictions can be achieved via tuning operations of the classifiers applied in Steps 308, 312 and/or 314, as discussed above. In some embodiments, a majority voting system can be employed for consistent predictions across multiple classifiers. In some embodiments, hierarchical annotation can leverage AI/ML classifications for broad categories, with LLM embeddings refining subcategories.

Thus, as the conclusion of Step 316, the dataset (from Step 302) can be stored in database 108 in a modified manner, with annotations to the dataset (as a whole) and/or annotations to the data (either all or a portion of such data) being provided. In some embodiments, such annotations can cause a modification to the dataset, which can include altering the data and/or the column/formatting of the dataset, for example.

In some embodiments, such annotations and/or modifications to the dataset, which are being cataloged, can be utilized by engine 200 to automatically generate a human-readable expanded version of the dataset and/or the classifications. For example, if a piece of data is classified under multiple categories (such as security and compliance), engine 200 can generate a detailed explanation of why the data was classified that way, providing transparency and traceability. Such human-readable output helps decision-makers understand the rationale behind the classification and ensures accountability in how data is treated.

And, in Step 318, engine 200 can compile electronic information related to and/or including the dataset for output to a requesting and/or receiving user/entity. As provided above, such output can be in compliance with legal, security and/or privacy regulations. In some embodiments, such output can enable the curated dataset to be delivered to a required entity/party/user (or electronic resource—for example, a repository and/or portal) over a network, such that the provided deliverable is consumable by a device and/or user, and/or visibly displayable in a manner for which the information within the dataset is digestible.

Figure 4:
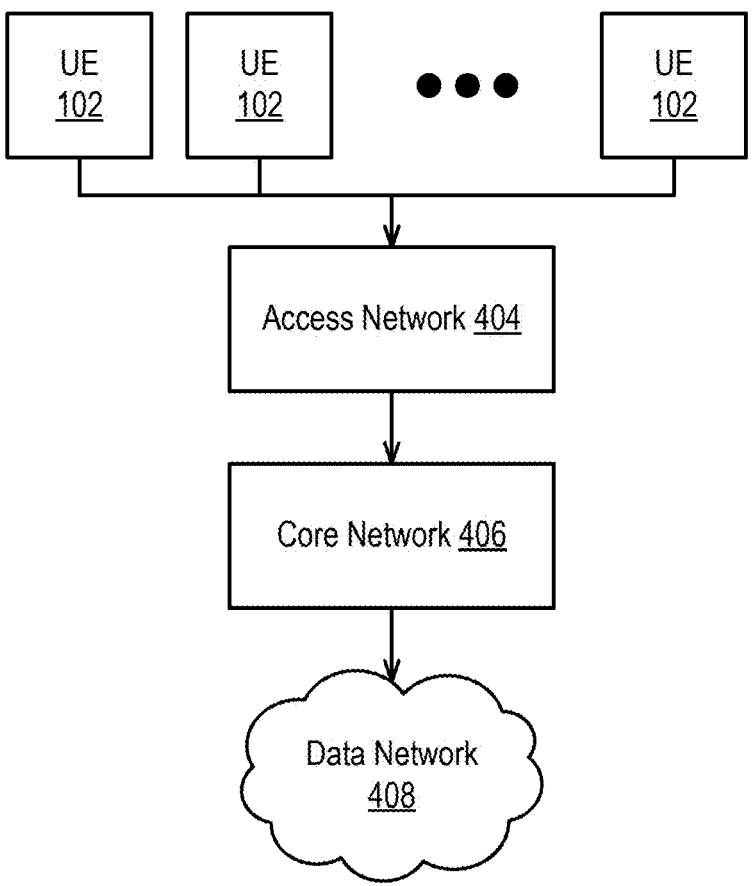
FIG. 4 illustrates a non-limiting example embodiment of a network architecture according to some embodiments of the present disclosure.

FIG. 4 is a block diagram of an example network architecture according to some embodiments of the present disclosure. In the illustrated embodiment, UE 102 accesses a data network 408 via an access network 404 and a core network 406.

In the illustrated embodiment, the access network 404 comprises a network allowing network communication with UE 102. In general, the access network 404 includes at least one base station that is communicatively coupled to the core network 406 and coupled to zero or more UE 102.

In some embodiments, the access network 404 comprises a cellular access network, for example, a 4G network. In an embodiment, the access network 404 can include a NextGen Radio Access Network (NG-RAN). In an embodiment, the access network 404 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 404 provides access to a core network 406 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 406 and to external network-attached elements in a data network 408 such as the Internet.

In the illustrated embodiment, the access network 404 and the core network 406 are operated by a NO. However, in some embodiments, the networks (404, 406) may be operated by a private entity and may be closed to public traffic. For example, the components of the network 406 may be provided as a single device, and the access network 404 may comprise a small form-factor base station. In these embodiments, the operator of the device can simulate a cellular network, and UE 102 can connect to this network similar to connecting to a national or regional network.

In some embodiments, the access network 404, core network 406 and data network 408 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 5:
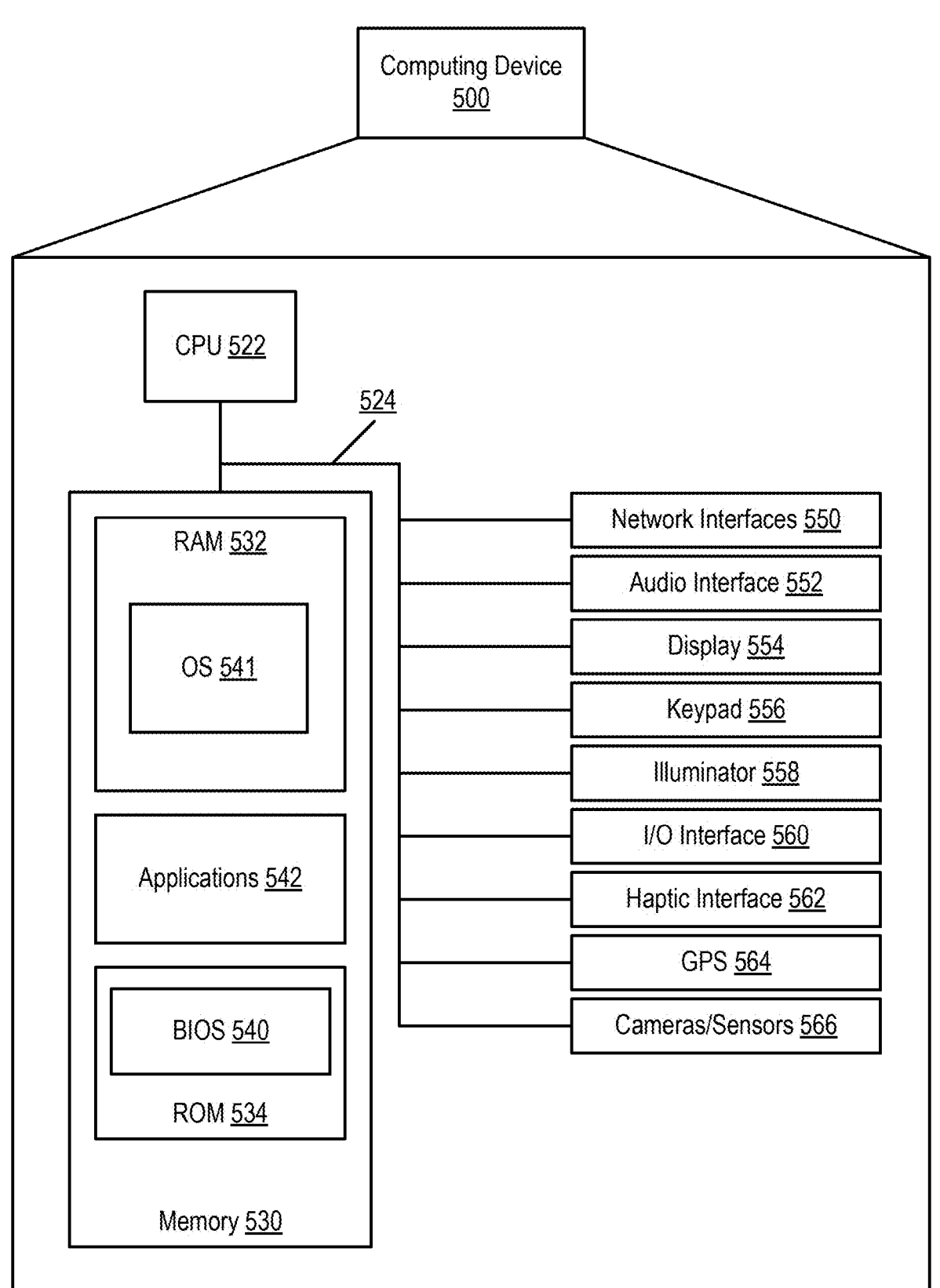
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads

556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a CPU 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to ROM 534.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special-purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

identifying a dataset;

analyzing the dataset, and determining, based on the analysis, a data profile and metadata;

executing a first computer model based on the data profile and metadata, and determining a classification of information within the dataset, the first computer model being trained to classify information based on statistical patterns and learned features;

executing a second computer model based on the data profile and metadata, and determining embeddings for the dataset, the embeddings capturing semantic relationships;

determining, based on the execution of the first computer model and the second computer model, a data classification, the data classification being based on the classification of the information within the dataset and the embeddings;

treating, based on the data classification, the dataset to generate a modified version of the dataset, the treatment comprising at least one of anonymizing or encrypting the dataset to enable sharing of the dataset across different environments in accordance with a policy; and outputting, over a network, a device-consumable version of the modified dataset to a receiving entity, the outputting enabling usage of the modified dataset by a device of the receiving entity.

2. The method of claim 1, further comprising:

annotating the dataset based on the classification of the information within the dataset and the embeddings, the annotations comprising a label corresponding to the information within the dataset.

3. The method of claim 2, further comprising the modified dataset including the annotations.

4. The method of claim 1, further comprising the first computer model executing an artificial intelligence (AI) model.

5. The method of claim 4, further comprising the AI model selected from a group consisting of: Naïve Bayes model, nearest neighbor model and decision tree model.

6. The method of claim 5, further comprising the classification of information performed by the first computer model corresponding to a classification of columns within the dataset.

7. The method of claim 1, further comprising execution of the second computer model comprising:

determining a Term Frequency Inverse Document Frequency (TF-IDF) representation;

executing a large language model (LLM); and determining a classification of the dataset based on an output of the LLM and the TF-IDF representation.

8. The method of claim 1, wherein the treatment includes at least one of one-way hashing, two-way hashing, or masking.

9. A system comprising:

a processor configured to:

identify a dataset;

analyze the dataset, and determine, based on the analysis, a data profile and metadata;

execute a first computer model based on the data profile and metadata, and determine a classification of information within the dataset, the first computer model being trained to classify information based on statistical patterns and learned features;

execute a second computer model based on the data profile and metadata, and determine embeddings for the dataset, the embeddings capturing semantic relationships;

determine, based on the execution of the first computer model and the second computer model, a data classification, the data classification being based on the classification of the information within the dataset and the embeddings;

treat, based on the data classification, the dataset to generate a modified version of the dataset, the treatment comprising at least one of anonymizing or encrypting the dataset to enable sharing of the dataset across different environments in accordance with a policy; and output, over a network, a device-consumable version of the modified dataset to a receiving entity, the outputting enabling usage of the modified dataset by a device of the receiving entity.

10. The system of claim 9, wherein the processor is further configured to:

annotate the dataset based on the classification of the information within the dataset and the embeddings, the annotations comprising a label corresponding to the information within the dataset.

11. The system of claim 9, further comprising the modified dataset including the annotations.

12. The system of claim 9, further comprising the first computer model executing an artificial intelligence (AI) model.

13. The system of claim 12, further comprising the AI model selected from a group consisting of: Naïve Bayes model, nearest neighbor model and decision tree model.

14. The system of claim 13, further comprising the classification of information performed by the first computer model corresponding to a classification of columns within the dataset.

15. The system of claim 9, wherein the processor is further configured to:

determine a Term Frequency Inverse Document Frequency (TF-IDF) representation;

execute a large language model (LLM); and determine a classification of the dataset based on an output of the LLM and the TF-IDF representation.

16. The system of claim 9, wherein the treatment includes at least one of one-way hashing, two-way hashing, masking, or encryption.

17. A non-transitory computer-readable storage medium tangibly encoded with computer-executable instructions, that when executed by a processor, perform a method comprising:

identifying a dataset;

analyzing the dataset, and determining, based on the analysis, a data profile and metadata;

executing a first computer model based on the data profile and metadata, and determining a classification of information within the dataset, the first computer model being trained to classify information based on statistical patterns and learned features;

executing a second computer model based on the data profile and metadata, and determining embeddings for the dataset, the embeddings capturing semantic relationships;

determining, based on the execution of the first computer model and the second computer model, a data classification, the data classification being based on the classification of the information within the dataset and the embeddings;

treating, based on the data classification, the dataset to generate a modified version of the dataset, the treatment comprising at least one of anonymizing or encrypting the dataset to enable sharing of the dataset across different environments in accordance with a policy; and outputting, over a network, a device-consumable version of the modified dataset to a receiving entity, the outputting enabling usage of the modified dataset by a device of the receiving entity.

18. The non-transitory computer-readable storage medium of claim 17, further comprising:

annotating the dataset based on the classification of the information within the dataset and the embeddings, the annotations comprising a label corresponding to the information within the dataset.

19. The non-transitory computer-readable storage medium of claim 17, further comprising:

determining a Term Frequency Inverse Document Frequency (TF-IDF) representation;

executing a large language model (LLM); and determining a classification of the dataset based on an output of the LLM and the TF-IDF representation, wherein the data classification is based on the determined classification of the dataset based on the output of the LLM, TF-IDF and the first model.

20. The non-transitory computer-readable storage medium of claim 17, wherein the treatment includes at least one of one-way hashing, two-way hashing, masking, or encryption.

\*    \*    \*    \*    \*